Dec. 3, 1968 W. HEIER 3,413,909
COFFEEMAKING APPARATUS
Filed June 15, 1967 4 Sheets-Sheet 1
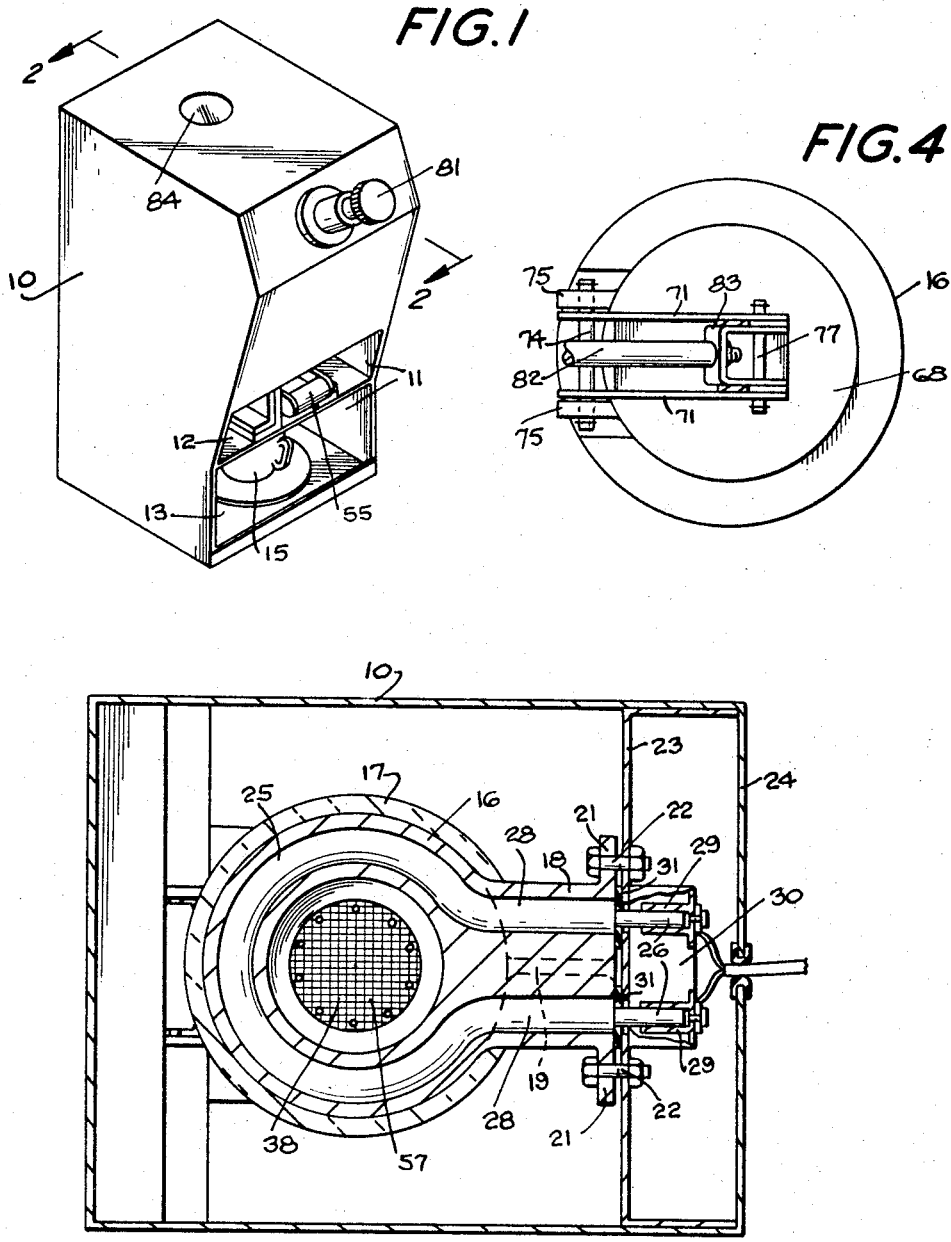
INVENTORS
WILLIAM HEIER
BY
Edelson and Udell
ATTORNEYS.

Dec. 3, 1968
W. HEIER
3,413,909
COFFEEMAKING APPARATUS
Filed June 15, 1967
4 Sheets-Sheet 2
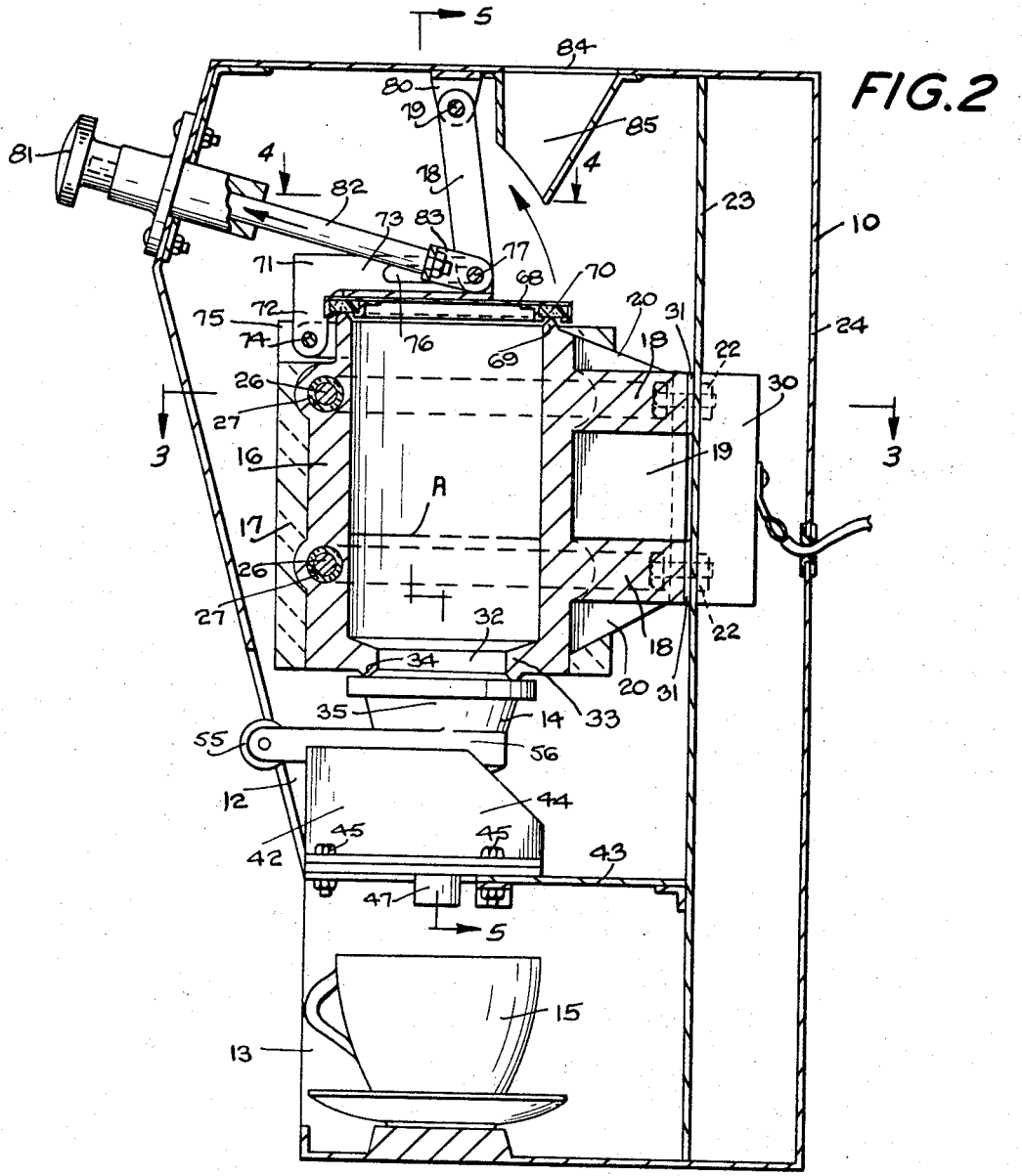
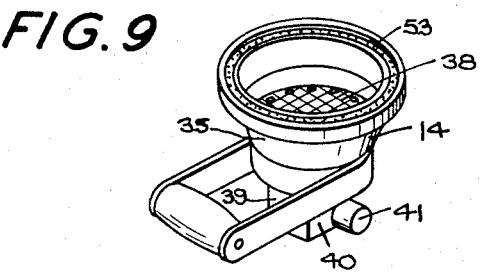
INVENTORS
WILLIAM HEIER
BY
Edelson and Udell
ATTORNEYS.

Dec. 3, 1968  W. HEIER  3,413,909
COFFEEMAKING APPARATUS
Filed June 15, 1967  4 Sheets-Sheet 3

INVENTORS
WILLIAM HEIER
BY
Edelson and Udell
ATTORNEYS.

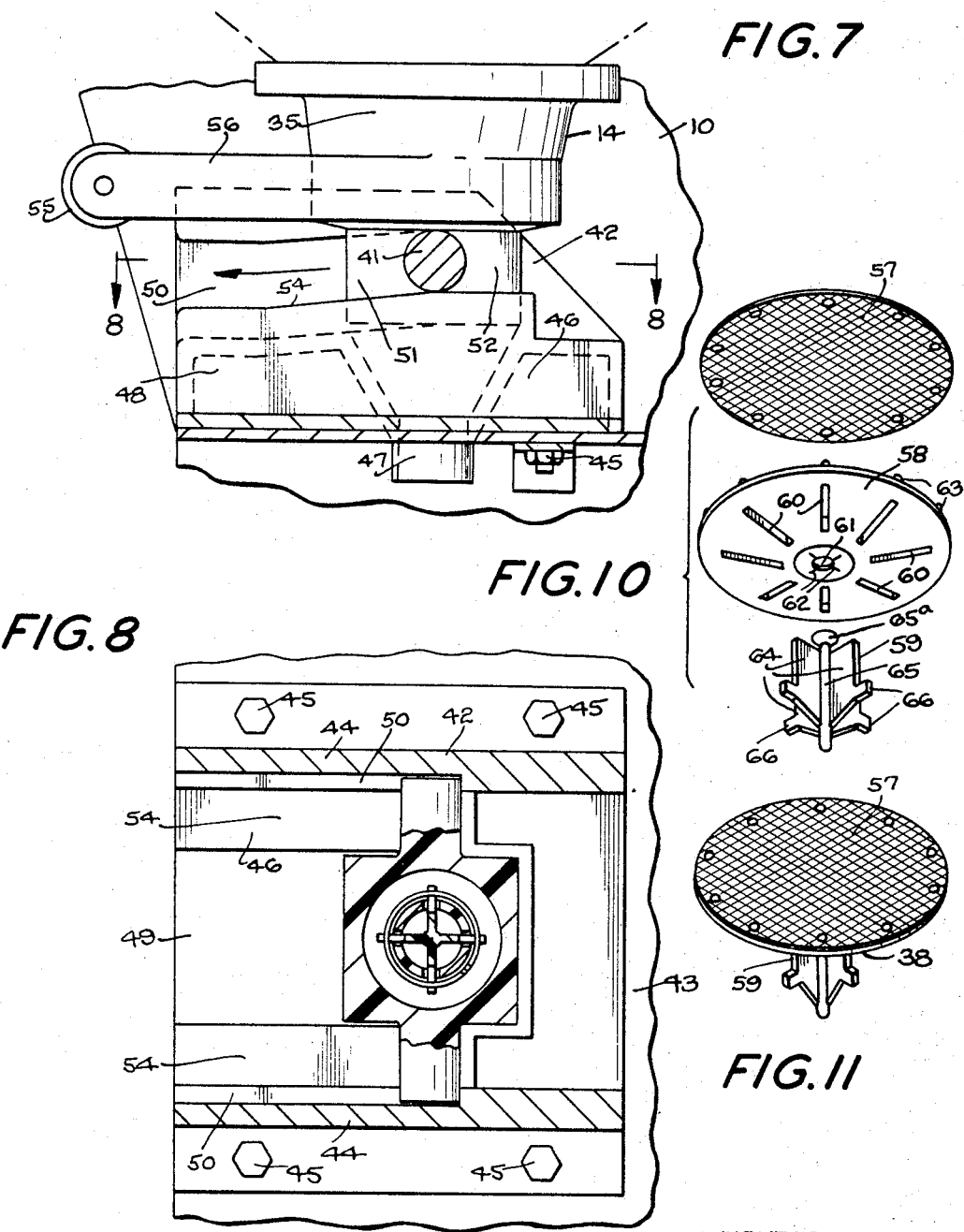

United States Patent Office 3,413,909
Patented Dec. 3, 1968

3,413,909
COFFEEMAKING APPARATUS
William Heier, 312 Henry Ave.,
Warminster, Pa. 18974
Filed June 15, 1967, Ser. No. 646,263
21 Claims. (Cl. 99—298)

ABSTRACT OF THE DISCLOSURE

Apparatus for sequentially brewing individual cup by cup servings of fresh hot liquid beverage, such as coffee. Each cup of coffee is brewed of a fresh charge of coffee grounds through which heated water is passed under the pressure of air expanded by heat in a closed heated vessel with which is sequentially introduced just enough water to make up a single cup of coffee. The coffee is brewed at a temperature below that of boiling water.

Provision is made in the apparatus for facilitating removal and replacement therein of a holder for the coffee grounds from which the coffee essence is extracted for each cupful of coffee, as well as for easy replacement in the holder of a filter assembly which underlies and supports the bed of coffee grounds during the coffee brewing operation. The filter assembly includes a filter disc and grid assembly which is disposable after such use thereof as may be desired.

---

This invention relates generally to the brewing of coffee and more particularly to an improved apparatus which is operative to successively brew and dispense, cup by cup, a fully brewed serving of hot coffee.

Among the principal objects of the present invention is to provide an apparatus which brews each cup of coffee automatically as it is supplied with an amount of water and a charge of fresh coffee grounds requisite for the preparation of an individual cupful of coffee.

More specifically, it is an important object of the present invention to provide a vessel which is adapted to receive therein a predetermined volume of water which leaves in the vessel a substantially larger volume of air space, the vessel containing such water and air being closed at its top by a hermetically sealed closure and at its bottom by a bed of coffee grounds whereby, when said vessel is heated to a predetermined temperature, air confined in the vessel above the level of the water therein is heated and expands to expel from the vessel and force through the bed of coffee grounds the water heated to a temperature below that of boiling water to produce a cupful of coffee of desirable temperature.

Another object of the invention is to provide in the apparatus above mentioned means for facilitating successive introductions of a predetermined quantity of water into the heating vessel and for sealing the same while the vessel is heated to produce such expansion of the heated air therein as will quickly expel the water and force it through an underlying bed of fresh coffee grounds to produce an individual serving (one cupful) of the coffee beverage.

A further object is to provide a vessel of a volumetric capacity adequate to contain water and air in such proportionate amounts that when the vessel is sealed and heated, heat is almost instantly transferred to the water and air contained therein to heat the water and expand the air for emulsion of the heated water through a bed of coffee grounds contained within a receptacle held in sealed engagement with the water discharge outlet of its containing vessel.

Still another object of the invention is to provide a receptacle for the coffee grounds which is adapted to be removed from and replaced in registry with the water discharge outlet of the heated vessel above mentioned, which includes means for directing the heated water passing through the coffee grounds into a cup as an individual serving of hot coffee and which is adapted additionally includes a disposable coffee filtering assembly quick-detachable seated in the bottom of said receptacle for the coffee grounds.

A still further object is to provide in the apparatus aforesaid simple and efficient means for loosening the used coffee grounds after passage of the heated water therethrough and extraction of the coffee essence therefrom to thereby facilitate removal of the used grounds from their receptacle and condition it for replenishment by a fresh charge of coffee grounds.

Still another important object of the invention is to provide an apparatus providing a novel technique for the preparation of individual servings of hot coffee without requiring the use of boiling water or steam and which once set up for operation may continue to successively produce cup after cup of hot coffee of uniform consistency from each cupful of cold water introduced into the apparatus and therein heated and therefrom expressed through a predetermined measure of fresh coffee grounds.

Still other objects of the present invention are to provide an apparatus of simple and inexpensive construction which may be readily installed at any convenient place of use without connection to a water supply nor anything more than a source of electrical supply for energizing electrical heater elements for heating the water-containing vessel.

The foregoing and other objects and advantages of the invention will more fully appear from the following description made in connection with the accompanying drawings, it being understood that the invention consists in the combination, construction, location and relative arrangement of the parts of the apparatus illustrated, and in the mode of using the same, all as hereinafter described, as shown in the drawings and as finally pointed out in the appended claims.

In the accompanying drawings:

FIGURE 1 is a perspective view of a coffee brewing machine constructed in accordance with and embodying the principles of the present invention;

FIGURE 2 is a transverse vertical sectional view of the machine as taken along the line 2—2 of FIGURE 1;

FIGURE 3 is a horizontal sectional view as taken along the line 3—3 of FIGURE 2;

FIGURE 4 is a sectional view taken along the line 4—4 of FIGURE 2 showing the mechanism for operating the top closure for the coffee brewing vessel;

FIGURE 7 is an enlarged side elevational view of the coffee filter as seen in the assembly of FIGURE 2;

FIGURE 8 is a horizontal sectional view of the coffee filter as taken along the line 8—8 of FIGURE 7;

FIGURE 9 is a perspective view of the coffee filter;

FIGURE 10 is an exploded view showing in perspective the several component elements of the replaceable filter unit; and FIGURE 11 is a perspective view of the replaceable filter unit.

Figure 5:
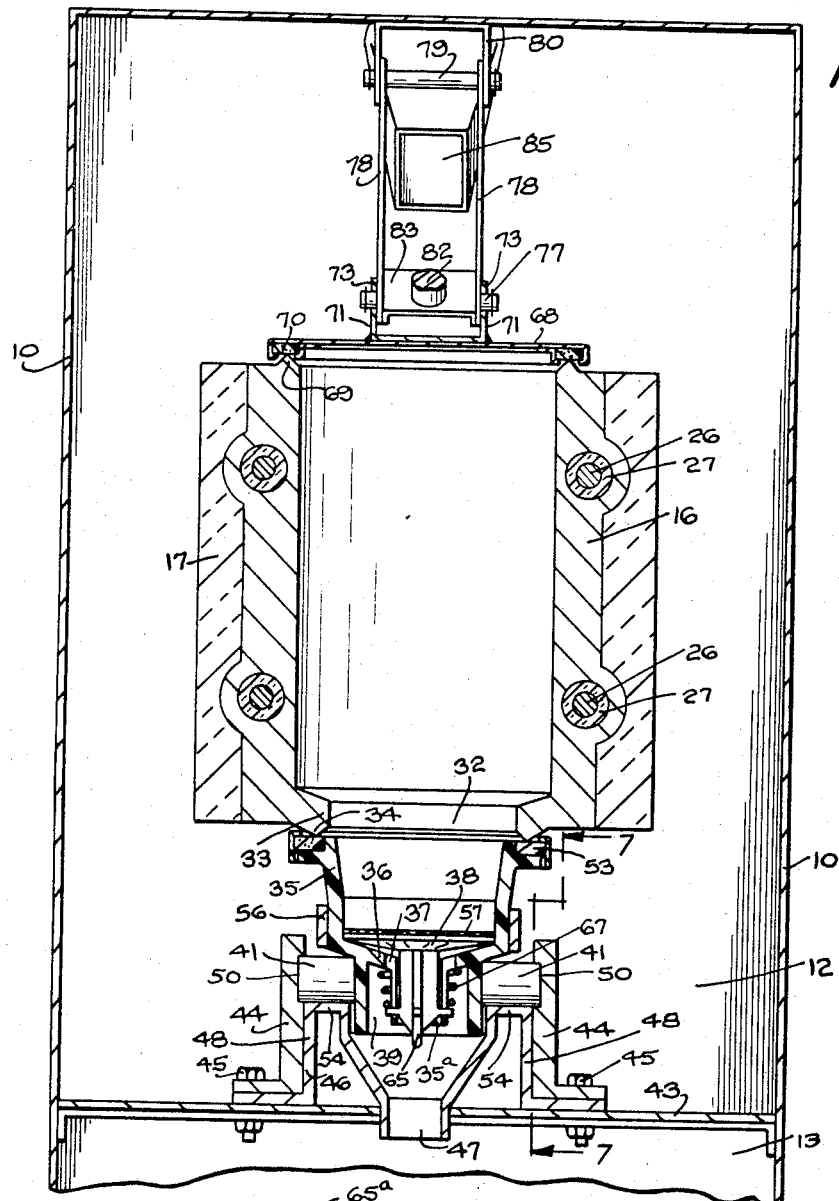
FIGURE 5 is a transverse vertical sectional view of the machine as taken along the line 5—5 of FIGURE 2.

Referring now more particularly to the drawings, it will be observed that the coffee brewing apparatus as constructed in accordance with and embodying the principles of the present invention is preferably enclosed within a suitable housing 10 the front wall of which is provided with an opening 11 providing easy access to a pair of vertically spaced compartments 12 and 13 respectively adapted to removably receive therein a receptacle 14 for the coffee grounds to be brewed and a cup 15 for receiving the brewed coffee.

Fixedly secured within the housing 10 in vertically spaced relation to the receptacle 14 for the coffee grounds is an open-ended cylinder 16 formed of aluminum or other metal having a high degree of thermal conductivity suitably encased within a heat insulating jacket 17. This cylinder 16 which may be cast or otherwise formed of one or more parts is provided with a pair of vertically spaced bosses 18—18 projecting radially outward of the cylinder wall. Preferably, these bosses 18—18 are integrally joined together by an intervening central web 19 and to the cylinder 16 by bracing gussets 20—20 disposed in the vertical plane of the web 19. The outer end of each of the bosses 18—18 is provided with an out-turned flange 21 to provide a coplanar pair of such flanges through which bolts 22 are projected for securing the cylinder 16 to a supporting wall 23 provided within the interior of the housing 10 in spaced parallel relation to the housing back wall 24.

Suitably set within the cast metal wall of the cylinder 16 substantially in embracing relation to the interior thereof and at one or more points along its length is an electrical heating unit 25, such as, for example, the "chromolox" type manufactured by Edwin L. Weigand and Company of Pittsburgh, Pa., having an electrically energizable heater element 26 which is encased by and is electrically but not thermally insulated from an outer sheath 27 formed of a material having a high degree of thermal conductivity. While in the illustrated constructions, two such heater elements are shown disposed in axially spaced relation, it will be understood that any suitable number of such heater elements may be set in the metal wall of the cylinder 16 for maximum distribution of the heat generated by the heater element or elements uniformly throughout the length of the cylinder.

Each of the heater units 25 is provided with parallel extremities 28—28 which extend through the cylinder mounting bosses 18—18, with the electrically energizable heater elements 26 projecting through the wall 23 for securement to electrically conductive terminals 29—29 of a terminal block 30 suitably secured within the space formed between the walls 23-24 of the housing 10.

When the cylinder 16 is provided with two or more of the heater units 25, the corresponding terminal ends of the electrically energizable elements 26 thereof are connected in parallel and are supplied with current from a suitable source of supply through a circuit which preferably includes a thermostat (not shown) for controlling the energization of the heater elements and thus establish and maintain the temperature of the heated wall of the cylinder 16 at a predeterminedly desired degree. Preferably, the optimum temperature of the cylinder wall for operation of the apparatus of the present invention is in the neighborhood of 245° F. ±10° F. for producing a cup of coffee having a temperature of about 175° F.

The bare extremities of the electrically energizable heater elements 26—26 are insulated both electrically and thermally from the wall 23 of the housing 10 by a pad 31 of suitable insulating material disposed between said wall and bolted ends of the cylinder mounting bosses 18—18.

The bottom end of the cylinder 16 is provided with a somewhat restricted opening 32 defined by an inwardly projecting annular flange 33 having a downwardly projecting circular rib 34 adapted to sealingly engage the upper rim of the coffee ground receptacle 14 when the latter is positioned in axial registry with the interior of the cylinder 16.

The coffee grounds receptacle 14 includes a cup-shaped part 35 which is open at its top end, has a downwardly dished bottom wall 36 centrally apertured as at 37 and is removably fitted with a filter assembly 38. Depending from the cup-shaped part 35 as an integrally formed part thereof is a hollow extension 39 of reduced transverse dimension, preferably of square or other polygonal cross-section to provide it with a pair of opposite parallel side walls 40—40. Projecting horizontally outwardly of these side walls 40—40 are a pair of axially alined trunnions 41—41 for removably supporting the receptacle 14 in sealed axial registry with the cylinder 16 as best shown in FIGURES 2 and 5.

Figure 6:
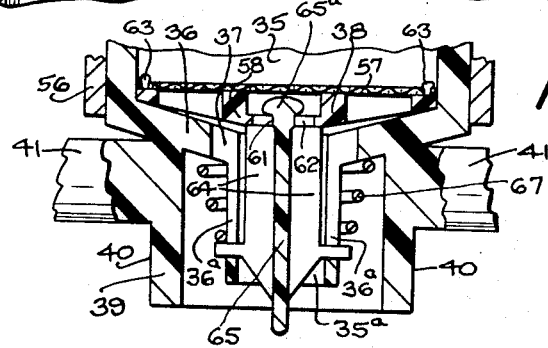
FIGURE 6 is an enlarged sectional view of the coffee filter also shown in smaller section in FIGURE 5.

Extending downwardly from the bottom wall 36 of the cup-shaped part 35 in axial registry with its central opening 37 is a cylindrical extension 35a having formed in its wall a plurality of circumferentially spaced slots 36a, the upper ends of which are open and extend into the bottom wall 36 of the cupped part 35. This cylindrical extension 35a is disposed centrally within the hollow extension 39 and is adapted to receive within its bore the support (to be hereinafter described) for the filter assembly 38. As most clearly appears in FIGURES 5 and 6, the slots 36a each extend from the bottom wall of the cup-shaped part 35 downwardly to a point short of the lower end of the extension 35a so as to close off the bottom ends of said slots for a purpose which will appear hereinafter.

The receptacle 14 is supported by its trunnions 41—41 within a support, generally designated by the reference numeral 42, fixedly positioned upon the shelf 43 which forms the bottom of the compartment 12 of the housing 10. This support 42 comprises a pair of vertically disposed side rail members 44—44 suitably secured, as by the bolts 45, upon the shelf 43 in laterally spaced, parallel relation.

Secured in position between the side rail members 44—44, also by the bolts 45, is a member 46, preferably molded of a suitable plastic material, to provide a funnel 47 through which the brewed liquid coffee is delivered to the underlying cup 15. The reduced coffee discharging end of the funnel 45 is adapted to be axially alined with the vertical axis of the cylinder 16 and terminates just below the shelf 43 at a point providing ample clearance for insertion and removal of the cup and saucer shown in FIGURE 2. The funnel member 46 is provided at opposite sides thereof with a pair of laterally-spaced parallel side wall portions 48—48 which extend longitudinally of the side rails 44—44 and provide therebetween a guide channel 49 open at its front end for receiving the bottom hollow extension 39 of the cup-shaped part 35 and non-rotatably guide it in its movement into and out of axial registry with the cylinder 16.

The side rail members 44—44 are respectively grooved upon their inner surfaces to provide a pair of opposed channels 50—50 which receive the ends of the oppositely projecting trunnions 41—41 for guiding the receptacle 14 into axial registry with the cylinder 16. The intermediate portions 51 of these channels 50—50 are inclined with respect to the horizontal (as see FIGURE 7) and terminate in horizontally extending portions 52 whereby as the assembly 14 is moved inwardly with its trunnions riding in the guide channels 50—50 the cup-shaped part 35 is cammed tightly in position against the circular bottom rib 34 of the cylinder 16. In this seated position of the assembly 14 against the cylinder 16, the cup-shaped part 35 thereof is effectively sealed thereto by pressure of the circular rib 34 against a compressible gasket 53 suitably fitted in the top rim of the cup-shaped part 35.

The side wall portions 48—48 of the member 46 are preferably formed to present their top edges 54—54 in planar coincidence with the bottom edges of the trunnion guide channels 50—50 in the side rail members 44—44, to thereby provide the guide channels for the trunnions 41—41 with bearing surfaces each substantially equal in width to the length of the trunnion.

While in the construction illustrated the member 46 is shown as a separate molded part fitted between the side rail members 44—44, it will be understood that the member 46 and the side rail members 44—44 may be cast or molded as a single unit adapted to be bolted in place by the bolts 45 to serve as a guide for sliding movement of the filter assembly 14 into and out of axial registry with the cylinder 16 and the coffee dispensing funnel 47.

For convenience in removing the assembly 14 from and replacing it in operative position with respect to the cylinder 16, it is preferably provided with a handle 55 extending transversely between the opposite ends of a U-shaped strap 56 suitably secured in embracing relation to the cup-shaped part 35 of the removable assembly 14.

The filter assembly 38 removably fitted within the cup-shaped part 35 of the receptacle 14 includes, as best shown in FIGURES 10 and 11, a filter element 57 in the form of a thin disc of "Teflon" blended with glass fibers or other suitable filtering material, a supporting grid 58 for the filter element and a spider-shaped member 59 for removably supporting the filter assembly within the cup-shaped part 35.

The supporting grid 58 for the filter element 57 is of a circular shape adapted for snug fit within the apertured bottom of the cup-shaped part 35. This supporting grid is formed of a plastic material, such as polypropylene or polyethylene, to the upper surface of which the filter element 57 is heat sealed or otherwise secured to provide a laminated assembly of the filter element and its supporting grid. The grid disc 58 is provided with a plurality of uniformly spaced, radially extending slots 60 or other openings of suitable size, shape and relative location to facilitate uniformly distributed passage therethrough of the coffee brew filtered through the filter element 57 and yet provide adequate support for the relatively fragile filtering element. Preferably the upper surface of the filter disc supporting grid 58 is provided with a series of circumferentially spaced modules 63 adapted to be projected through correspondingly spaced holes in the filter disc 57 to seat the latter in proper registry with its support, which modules may be beaded or swaged, as by heat or pressure, to secure the filter disc to its support.

Also formed in the supporting grid 58 is a central aperture 61 having slits 62 extending radially therefrom to provide the center of the grid with relatively flexible segmental portions to constitute in effect a snap-fastener type socket into which the spider-shaped member 59 of the filter assembly may be snap-fitted as will presently appear.

This spider-shaped member 59, which is adapted to be slidably inserted into the tubular extension 35a of the member 35, is provided with a plurality of uniformly spaced vanes 64 extending radially outward from a central stem 65 having freely projecting upper and lower ends with upper end shaped to provide an enlarged, rounded head 65a adapted to be snap-fitted into the above described central socket of the filter support grid 58. The radial vanes 64 of the member 59 are respectively provided at their bottom ends with lateral projections 66 adapted respectively to project through the slots 36a formed in the wall of the cylindrical extension 35a which receives the spider 59 of the filter assembly 38. A coiled compression spring 67 disposed in embracing relation about the cylindrical extension 35a with its opposite ends respectively bearing against the bottom wall 36 of the cup-shaped member 35 and the lateral projections 65 of the spider 59 serves to resiliently secure the filter assembly 38 in position with its filter element seated firmly in the bottom of the cup-shaped member 35 as a filtering bed for the coffee grounds contained therein.

The cylinder 16, which is adapted to receive an amount of water sufficient to brew a cup of coffee from the charge of coffee grounds contained in the cup-shaped part 35 of the coffee grounds receptacle 14 is provided at its upper end with a top closure 68 which is adapted to be hermetically sealed against a circular seat 69 formed in the top edge of the cylinder. To this end, the top closure 68 is preferably fitted with an annular sealing gasket 70 which is compressible against the circular seat 69 of the cylinder when the top thereof is closed.

The top closure 68 is carried by a pair of bell-crank levers 71—71 having angularly related arms 72 and 73.

The short arms 72—72 of the levers 71—71 pivot about a hinge pin 74 extending transversely between pivot lugs 75—75 formed integral with the cylinder casting, while the long arms 73—73 of the levers 71—71, which overlie and are rigidly secured to the top of the closure 68, are each slotted, as at 76, for pivotal connection respectively to a hinge pin 77 extending transversely between the bottom ends of a pair of links 78—78. These latter links have their upper ends pivotally connected, as by a transverse hinge pin 79, to an inverted U-shaped bracket 80 suitably secured to the top of the housing above the center of the cylinder 16.

An operating knob 81 for the closure 68 is suitably mounted in the front panel of the housing, which knob is provided with an inwardly extending rod 82 having its inner end pivotally connected to the hinge pin 77 through a connecting yoke piece 83.

The hinge pin 77 is adapted to ride in the elongated slots 76 of the lever arms 73—73 and it will be apparent that as the handle 79 is drawn outwardly of the housing 10, the hinge pin 77 shifts outwardly along the slots 76 and simultaneously swings the levers 71—71 upwardly about their pivot 74 to thereby raise the closure upwardly into open position. When the knob 81 is pushed in, as shown in FIGURE 2, the hinge pin 77 assumes a position at which the bottom ends of the links 78—78 cross dead center of the toggle joint and are placed under compression to press the closure into hermetically sealed engagement with the top of the cylinder 16.

As most clearly appears in FIGURES 1 and 2, the top wall of the housing 10 is apertured, as at 84, and internally fitted with a registering spout 85 having a pouring lip suitably disposed to direct water introduced through the opening 84 into the interior of the cylinder 16 when its closure is raised in open position upon outward pull of the knob 81.

The volumetric capacity of the cylinder 16 is preferably such that upon introducing therein a cup of cold water (approximating 11 cubic inches), to the level designated A in FIGURE 2, there remains an air-filled space above the water level of approximately 22 cubic inches. We have found that the optimum volumetric ratio of air and water contained in the sealed cylinder 16 is approximately 2:1 for brewing a cup of coffee of acceptable flavor and color in about 25 to 30 seconds with the cylinder 16 heated to a jacket temperature of from 235° F. to 255° F.

When the sealed cylinder 16 containing this optimum ratio of water and air is heated by its electrically energizable heater elements to said temperature of 245±10° F., the air contained therein expands almost instantly to expel the water under pressure of the expanded air through the coffee grounds contained in the cup-shaped member 35 and the filter assembly serving as a bed for the coffee grounds to and through the funnel 47, for the reception in the cup 15 as a brewed cup of coffee.

In operation of the apparatus, starting with a jacket temperature of about 245° F. for the cylinder 16, upon entering therein a cup of cold water to be brewed as a coffee beverage, the water starts exiting from the cylinder within 2 or 3 seconds and is completely expressed therefrom within 25 to 30 seconds at a discharge temperature prior to contact with the coffee grounds in the container 35 of about 200° F. As the first increment of this heated water so expressed from the cylinder by the pressure of the air therein pass through the unheated coffee grounds and thence into the relatively cool cup 15 as a coffee beverage, it loses some of its exit temperature but as the water continues to pass through the subsequently heated coffee grounds, its lost temperature is largely regained and the coffee as finally brewed and received in the cup 15 is of an average temperature of about 170 to 180° F. Thus, the coffee beverage received in the cup ready to be drunk has never been subjected to a boiling temperature and yet is delivered at a desirably hot temperature.

While as stated above the optimum ratio of air to water in the cylinder 16 is about 2:1 for producing a cup of brewed coffee within 25 to 30 seconds, the ratio may be increased to as much as 3:1 with resultant increase in the time consumed for brewing a cup of coffee. The greater the volume of air contained in the cylinder 16 for a cup of water therein, the more time is consumed for it to be heated and expanded to the degree necessary for expelling all of the water out of the cylinder, and if a short brew time is not a critical requirement for operation of the apparatus, a longer brew time may be obtained by providing the cylinder with a capacity for receiving an increased amount of air.

It will be understood, of course, that for each cup of coffee to be produced, a fresh charge of coffee grounds is utilized which charge of coffee is readily effected by removing the unit 14 out from under the cylinder 16 and then replacing it in position with a fresh charge of coffee grounds placed in the cup-shaped part 35 thereof. Also, it will be understood that for each cup of coffee to be prepared, the top closure 68 of the cylinder 16 is opened to receive therein an amount of water just sufficient to brew a single cupful of coffee.

Since the coffee grounds in the container 35 are dried by the heated air passing therethrough following complete expulsion of all of the water from the cylinder 16, such caking of the dry coffee grounds in the container as might prevent easy removal thereof may be broken up preliminarily to its removal by axially shifting the spider 59 upwardly against the biasing effort of the spring 67. This is readily effected by pushing against the bottom end of the spider stem 65, thereby loosening the dried and possibly caked coffee grounds sufficiently to be dumped out of the container 35.

The filter bed for the coffee grounds, consisting of the porous filter element 57 and its perforated supporting grid 58, is preferably designed to be disposable after limited use thereof, as, for example, after using a pound of coffee to replenish the coffee grounds required for each cup of coffee beverage produced. It is to this end that the supporting grid 58 for the filter element 57 is quick-detachably secured to the spider 59 resiliently held in the coffee ground container 35. When it is desired to replace the filter bed, it is only necessary, after dumping out the used coffee grounds as above described, to press the stem 65 of the spider upwardly against the bias of its retaining spring 67 to raise the filter bed in the container 35 to a height sufficient for it to be grasped and pulled apart from the spider 59 to which it is fastened by the quick-detachable snap-fastening elements hereinbefore described, to wit, the central expansible socket in the grid 58 and the rounded head 65a of the spider stem 65.

It has been found that the present apparatus requires the use of less coffee for each cup of the coffee beverage produced and also that better extraction of the coffee is obtained, with less bitter taste thereof, due, we believe, to the fact that extraction commences at a relatively low temperature below that of boiling water and is completed at a higher temperature, which while still below water boiling temperature, is desirable for a hot coffee drink. Further, by providing the charge of coffee grounds in the container 35 with an underlying filter bed as described, the rate at which the heated water from the cylinder is expressed therefrom into the cup 15 as a coffee beverage is prolonged for a time sufficient to obtain a satisfactory extraction of the coffee for producing a most desirable cup of coffee.

It will be understood that the apparatus of the present invention is capable for use not only for the brewing of coffee but also for the brewing of other liquid beverages utilizing charges of particulate material from which the essence of the beverage to be produced is extracted, it being only necessary to provide the receptacle for such material with a filter assembly of a design requisite for suitably controlling the rate of passage of the heated water through the beverage-producing material.

It will be understood further that the present invention is susceptible of various changes and modifications which may be made from time to time without departing from the essential principles or real spirit thereof, and it is accordingly intended to claim the invention broadly, as well as specifically, as indicated by the appended claims.

What is claimed as new and useful is:

1. An apparatus for freshly brewing individual servings of a beverage comprising, in combination, a vessel adapted to contain in the bottom thereof a predetermined volume of water and above the level of said water a volume of atmospheric air substantially greater than the said volume of water, said vessel having a bottom opening adapted to be closed off by a charge of particulate material through which the water passes for extraction of the beverage essence, a removable receptacle for a charge of the particulate material of which the beverage is brewed adapted to be water-tightly seated against the bottom said vessel in registry with said bottom opening, a top closure for said vessel adapted to be opened for introduction of said water into said vessel and closed to hermetically seal the top of said vessel after interduction of said water therein, and means for heating the water and air contained in said vessel to an elevated temperature to expand the air sufficiently to expel heated water from the vessel and force it through the charge of beverage-producing material contained in said receptacle to provide a serving of the beverage.

2. In an apparatus as defined in claim 1 wherein said vessel is formed of a material having a high degree of thermal conductivity and wherein the wall of said vessel has incorporated therein electrically energizable heater elements for heating the interior of the vessel to a predetermined temperature sufficiently high to effect the requisite expansion of the air contained in the vessel for expulsion of the heated water therefrom.

3. In an apparatus as defined in claim 1 wherein the volumetric ratio of air to water in said vessel is at least 2:1.

4. In an apparatus as defined in claim 1 wherein the means for heating said vessel maintains it uniformly heated to a temperature of 245±10° F.

5. In an apparatus as defined in claim 1 wherein said receptacle for the beverage material is provided with a centrally apertured bottom wall and with a removable filter element overlying said bottom wall.

6. In an apparatus as defined in claim 1 wherein said receptacle for the beverage material includes a cup-shaped part adapted to receive therein a predetermined measure of said material for each cup of the beverage brewed thereof in the apparatus.

7. In an apparatus as defined in claim 6 wherein said cup-shaped part is provided with a top opening defined by a rim having fitted therein a sealing gasket and wherein the bottom opening of said vessel is defined by a flange having a seat against which said gasket is adapted to be pressed to provide a water tight seal between the receptacle and the vessel.

8. In an apparatus as defined in claim 1 wherein means spaced vertically below the bottom end of said vessel are provided for guiding the receptacle for the beverage material into and out of its aforesaid water-tight engagement with the vessel.

9. In an apparatus as defined in claim 8 wherein said guide means for the receptacle for the beverage material includes a pair of spaced apart tracks extending transversely of the vertical axis of said vessel and in straddling relation to the bottom opening thereof and wherein said receptacle includes oppositely projecting trunnions which respectively ride in said tracks as the receptacle is moved into and out of registry with said bottom opening of the vessel.

10. In an apparatus as defined in claim 9 wherein spaced inner portions of said tracks are upwardly inclined and elevated relatively to the outer ends thereof to cam said trunnions upwardly toward the bottom end of the vessel as said receptacle is moved into registry with the vessel bottom opening to thereby tightly seat said receptacle against the bottom of said vessel.

11. In an apparatus as defined in claim 1 wherein the volume of water entered into said vessel is sufficient to produce a cupful of said beverage and wherein said expansion of the heated air is sufficient to expel all of the heated water from said vessel so that said beverage is dispensed at a desirable temperature.

12. An apparatus for sequentially brewing individual servings of fresh hot coffee beverage comprising in combination a chambered cylinder having an hermetically sealable opening through which water may be introduced into the cylinder chamber in an amount sufficient to produce a single serving of coffee, the chamber being of a volumetric capacity to provide above the level of the water contained therein a free space filled with air under atmospheric pressure of a volume substantially greater than that of the water, said cylinder having an opening in its bottom in communication with said chamber for discharge of the water therefrom, a member having an open-topped cup-shaped part providing a cavity for receiving therein a predetermined measure of coffee grounds required for producing a single serving of coffee, said member being movable into and out of a position in which said cup-shaped part is water-tightly seated against the bottom end of said cylinder with its cavity in registry with said water discharge opening of the cylinder chamber whereby the coffee grounds contained in said cavity serve as a porous bed for restricting the flow of the water from said cylinder chamber, means for heating the interior of said cylinder and thereby heat the water and air contained in the cylinder chamber to a temperature sufficient to effect expansion of the air and expulsion thereby of the water from said cylinder chamber and through said bed of coffee grounds for extraction therefrom of the coffee essence.

13. In an apparatus as defined in claim 12 wherein said cup-shaped part is fitted with an axially movable filter unit in underlying relation to the bed of coffee grounds contained therein.

14. In an apparatus as defined in claim 12 wherein said cup-shaped part is provided with a centrally apertured bottom wall and with disposable filtering means quick-detachably mounted in overlying relation to said apertured bottom wall.

15. In an apparatus as defined in claim 12 wherein said cup-shaped part is provided with a centrally apertured bottom wall and with a depending tubular extension in axial registry with the aperture in said bottom wall, and is further provided a filtering assembly which includes a porous filter element, a perforated grid serving as a base for and to which said filter element is secured, and a support for said perforated grid adapted to be resiliently seated in said tubular extension whereby to hold the filter element and grid spring-pressed against the apertured bottom wall of said cup-shaped part.

16. In an apparatus according to claim 12 wherein the combination therein defined is enclosed within a housing in the bottom of which is provided means for guiding said coffee grounds receiving member into and out of seated position against the bottom end of said cylinder and means for supporting a cup in position beneath said member for receiving the brewed coffee.

17. In an apparatus according to claim 16 wherein said guide means includes a funnel in vertically spaced axial registry with the central aperture in the bottom wall of said cup-shaped part through which the brewed coffee is directed into the cup supported therebelow.

18. In an apparatus according to claim 16 wherein the said housing includes externally accessible means for opening and closing a closure for said hermetically sealable opening through which water is introduced into the internal chamber of said cylinder.

19. A receptacle for holding a measured quantity of a beverage producing material in particulate form through which heated water is passed for the preparation of a liquid beverage comprising, in combination, a cup-shaped member providing a cavity for said beverage material having an open top end and a centrally apertured bottom wall, a tubular extension depending from said bottom wall in axial registry with its central aperture and a filter assembly movably seated in said cup-shaped member, said filter assembly including a porous filter unit overlying said apertured bottom wall and a support for said filter unit slidably disposed in said tubular exension.

20. In a receptacle as defined in claim 19 wherein said support for the filter unit is held captive in said tubular extension by spring means which bias said filtering unit into close fitting overlying position with respect to said apertured bottom wall of said cavity.

21. In a receptacle as defined in claim 20 wherein said support for the filter unit is axially shiftable within said tubular extension against the bias of said spring means to move said filtering unit apart from said apertured bottom wall to thereby loosen in the cavity the particulate beverage material which may be found therein and so facilitate dislodgement of all of the used material from the receptacle by dumping the same therefrom preparatory to filling it with a fresh measure of the beverage-producing material.

References Cited
UNITED STATES PATENTS

| | | | |
|---|---|---|---|
| 2,589,783 | 3/1952 | Crossley | 99—323 X |
| 3,092,012 | 6/1963 | Ruhnke | 99—307 |
| 3,120,440 | 2/1964 | Ross | 99—298 X |
| 3,369,478 | 2/1968 | Black | 99—298 X |

ROBERT W. JENKINS, *Primary Examiner.*